Oct. 27, 1959  A. CLAAS  2,909,887
BALING PRESS FOR HAY OR STRAW
Filed May 19, 1955

Inventor
August Claas
by F. D. Prager
Att'y

United States Patent Office 2,909,887
Patented Oct. 27, 1959

2,909,887

BALING PRESS FOR HAY OR STRAW

August Claas, Harsewinkel, Westphalia, Germany

Application May 19, 1955, Serial No. 509,602
In Germany October 1, 1948

Public Law 619, August 23, 1954
Patent expires October 1, 1968

2 Claims. (Cl. 56—341)

My invention relates to a baling press for baling hay or straw of the type in which the press box is so carried by the frame that its open charging end is located at a rather high level necessitating the provision of feeding means for lifting up and feeding the hay or straw to be baled and conveying the same to the charging end of the press box.

In prior baling presses of this type such feeding means were rather complicated.

It is the object of the present invention to provide an improved baling press in which the means for picking up the material and feeding the same to the charging end of the press box are extremely simple, cheap in manufacture and reliable in operation.

Figure 1:
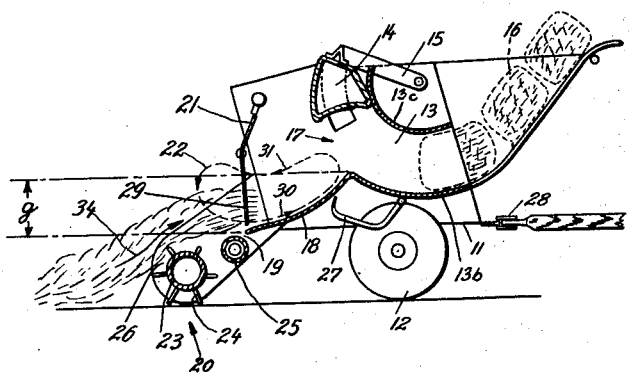
Figure 2:
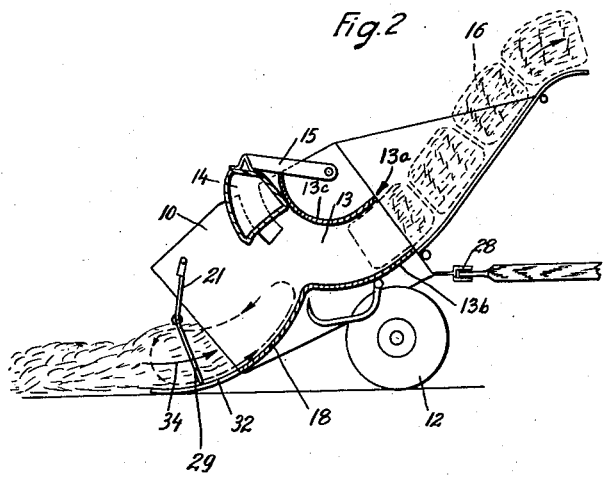

Further objects of the present invention will appear from a detailed description of a preferred embodiment of the invention following hereinafter. However, I wish it to be understood that such detailed description serves the purpose of illustrating the invention rather than that of restricting or limiting the same. In the drawings, Fig. 1 is a diagrammatical elevation partly in section of a preferred embodiment of the novel baling press, and Fig. 2 is a similar view showing a modification.

On a frame 10 which is supported on the floor by a suitable means, such as a chassis 11 provided with a pair of wheels 12, the press box or baling chamber 13 is mounted which has arcuate equidistant bottom and top walls 13b and 13c, respectively cooperating with a baling ram 14 carried by a swinging arm 15. Suitable means not shown are provided for intermittently rocking the arm 15 to move the ram 14 from the withdrawn upper position shown in Fig. 1 downwardly into the press box 13 to compress the material with which it has been previously charged to thereby form bales or bundles 16 which are ejected from the discharge end 13a of the press box 13 by suitable means not shown.

As the charging end 17 of the press box 13 is located at a rather high level above the floor, it is necessary to provide suitable feeding means to feed the material into the press box 13. I have provided novel and particularly simple feeding means for that purpose comprising a sloping feed table 18 which extends from the charging end 17 of the box 13 downwardly in slanting direction to a point 19. The level of this point is spaced a distance g from the level of the charging end 17. A pick-up device 20 is carried by the frame 10 and located between the point 19 and the floor. This pick-up device serves the purpose of picking up the hay or straw lying on the floor and of feeding the same onto the feed table 18.

A movable sweeper means is mounted on the frame 10 above the feed table 18 for movement along the same from the point 19 to the charging end 17. This sweeper means is adapted to receive the hay or straw from the pick-up device 20 and to sweep same upwardly toward the top wall 13c and into the charging end 17 for subsequent compression in the box 13. In the embodiment shown, this movable sweeper means comprises an oscillating arm 21 and a gripping arm 29 pivotally connected to the end thereof. When arm 21 is rocked by a suitable driving mechanism not shown in anti-clockwise direction, such movement will carry along arm 29 in the relative angular position of the arms 21 and 29 as shown to thereby feed the material in the direction of the arrow 30. When the arm 21 is rocked back in clockwise direction, however, arm 29 is dragged over the material as indicated by the arrow 31. In this manner, the lower end of arm 29 will move substantially along the path indicated by the dotted line 22. Because the specific structure of the oscillating arm and gripper arm is well known in the art, as disclosed for example in British patent to Claas, No. 447,365, and is not incorporated in the claimed subject matter, further detailed description thereof is not believed to be necessary.

In the embodiment shown in Fig. 1 the pick-up device comprises a drum 23 provided with peripheral tines 24 and a conveying roller 25 cooperating with the tined drum. The drum 23 and the roller 25 are mounted on an extension 26 of frame 10.

In operation the gripping arm 21 acting from above will grip the material and sweep the same over and along the top surface of the upwardly extending feeding table 18 thus raising the material a distance g and charging it into the mouth 17 of the press box 13 in a direction substantially normal to the top wall 13c of the press box where it is compressed by the ram 14 into the bundles 16.

An oscillating needle 27 of the type used for automatic binding may cooperate with the press box in a manner well known in the art. A farm cart not shown may be coupled to the chassis 11 in a known manner by means of a coupling 28.

The embodiment shown in Fig. 2 of the drawings differs from that shown in Fig. 1 primarily in that the pick-up device comprises a tined rake 32 which is rigidly mounted on the feed table 18 at the lower end thereof and extends to the floor. The rake 32 cooperates with the sweeper means 21, 29 which operate in the manner described hereinabove.

From the foregoing description it will appear that my improved baling press has extremely simple means for picking up the straw or hay from the floor and sweeping same in the direction of arrow 34 into the mouth of the press box 13 raising same to the necessary height by means of the sloping feed table 18.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. In a baling press of a character including an elongated frame, a feed table at one end of said frame adapted to receive balable material at a receiving end thereof, a concave top surface on said table extending upwardly from the receiving end to a discharge end thereof, a press box at the other end of said frame including spaced concentric upper and lower arcuate walls which jointly define a receiving end in direct communication with the discharge end of the feed table and also define a discharge end, sweeper means journalled above said feed table for arcuate upward movement concentric with and adjacent to the concave top surface of the feed table and for a return movement, the mounting and arrangement of said feed table, upper wall of press box and sweeper means being such that upward movement of the sweeper means sweeps the balable material toward said upper wall in a direction substantially normal thereto, and a ram movable through an arc concentric to the curvature of the arcuate walls operable to press the material into said press box and to discharge the pressed material from the discharge end thereof.

2. In a baling press of a character including a feed table adapted to receive balable material at a receiving end thereof, a concave top surface on said table extending upwardly from the receiving end to a discharge end thereof, a press box including spaced concentric upper and lower arcuate walls which jointly define a receiving end in direct communication with the discharge end of the feed table and also define a discharge end, sweeper means journalled above said feed table for arcuate upward movement concentric with and adjacent to the concave top surface of the feed table and for a return movement, the mounting and arrangement of said feed table, upper wall of press box and sweeper means being such that upward movement of the sweeper means sweeps the balable material toward said upper wall in a direction substantially normal thereto, and a ram movable through an arc concentric to the curvature of the arcuate walls operable to press the material into said press box and to discharge the pressed material from the discharge end thereof.

References Cited in the file of this patent

UNITED STATES PATENTS

| | | |
|---|---|---|
| 1,270,123 | Dain | June 18, 1918 |
| 2,487,938 | Nikkel | Nov. 15, 1949 |
| 2,545,188 | Baskerville | Mar. 31, 1951 |
| 2,552,888 | Druetta | May 15, 1951 |
| 2,633,691 | Lytle | Apr. 7, 1953 |

FOREIGN PATENTS

| | | |
|---|---|---|
| 423,692 | Great Britain | Feb. 6, 1935 |
| 447,365 | Great Britain | May 18, 1936 |
| 839,544 | France | Jan. 4, 1939 |
| 111,065 | Australia | July 16, 1940 |